April 13, 1965   H. R. NORMAN   3,177,626
METHOD AND APPARATUS FOR SHAPING CRYSTALLINE BODIES
Filed May 28, 1962   3 Sheets-Sheet 1

Inventor
Harvey R. Norman
By Cushman, Darby & Cushman
Attorneys

United States Patent Office

3,177,626
Patented Apr. 13, 1965

3,177,626
METHOD AND APPARATUS FOR SHAPING
CRYSTALLINE BODIES
Harvey R. Norman, R.R. 1, North Bay, Ontario, Canada
Filed May 28, 1962, Ser. No. 198,359
Claims priority, application Canada, July 6, 1961, 827,089
14 Claims. (Cl. 51—164)

This invention relates to a method and apparatus for shaping crystalline bodies such as diamonds and the like.

Industrial diamonds as mined are irregular in shape and include weak projections. Sometimes the diamonds are partially fractured along certain cleavage planes. In order to make the diamonds suitable for industrial use, it is necessary to break off the weak projections to complete any partial fractures and to smooth off rough surfaces. The foregoing has been accomplished by a rumbling operation in which the diamonds are placed in a barrel which is rotated about its axis and also moved in an orbit to provide a tumbling action. Weak projections and partial fractures are broken due to the diamonds being caused to grind each other and there is also a polishing action which is largely due to the minute diamond particles which become separated during the rumbling operation. The rumbling operation is accompanied by a reduction in the size of the diamonds. The rounding off of relatively large raw diamonds requires more extended tumbling than is the case with smaller diamonds. Consequently, it is an inevitable result of previously used rumbling operations that the small diamond particles separated from larger diamonds by breaking off weak projections and the like are reduced in size to an undesirable extent. The value of the diamonds per carat decreases as the diamonds are reduced in size. Thus diamonds of a size greater than about twenty mesh (Tyler screen size) can be used for diamond drills and the like and have a certain value. Diamonds in the range twenty mesh to two hundred mesh can be used for diamond abrasives, diamond grinding wheels and the like and have a value about half that of diamonds in excess of twenty mesh. Diamonds between two hundred mesh and 2 microns are used largely for polishing and have a value about one-third that of diamonds in excess of twenty mesh. Diamonds of a size less than two microns can be used for some polishing applications but have a value about one-tenth that of diamonds in excess of twenty mesh. It will thus be noted that there is an abrupt drop in value as the size is reduced below about two microns.

The object of this invention is to provide a method and apparatus for rumbling diamonds and the like in which provision is made for decreasing the reduction in size of small diamond particles.

A further object of this invention is to achieve the foregoing while utilizing the polishing action in the rumbling operation of very small diamond particles.

Other objects and advantages of this invention will be apparent from the detailed description of the preferred embodiment of the invention.

It has been found, in accordance with this invention, that the foregoing can be accomplished by tumbling the diamonds in the presence of a liquid in a grinding zone, continuously removing diamonds of a predetermined size range from said grinding zone, leaving diamonds of a size greater than said predetermined size range in said grinding zone and utilizing part of the diamonds of a size less than said predetermined size range in said grinding zone in suspension in said liquid.

In the drawings which illustrate the preferred embodiments of this invention:

Figure 1:
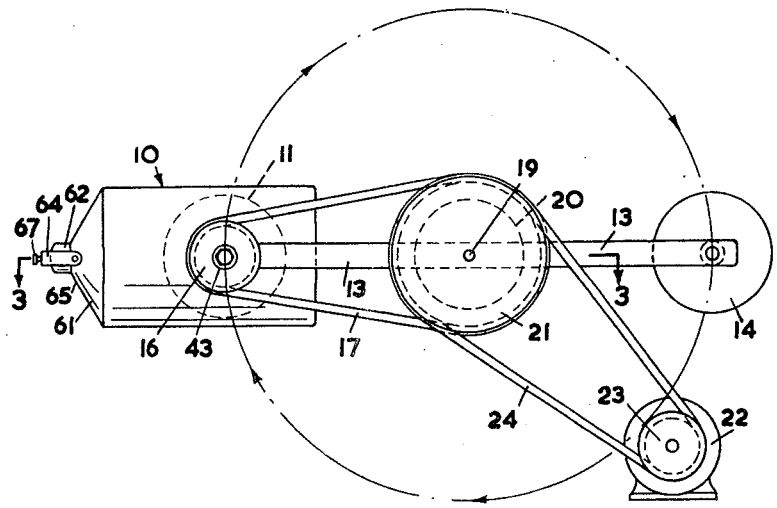
FIGURE 1 is an end elevation view of a rumbling apparatus in accordance with this invention.
Figure 2:
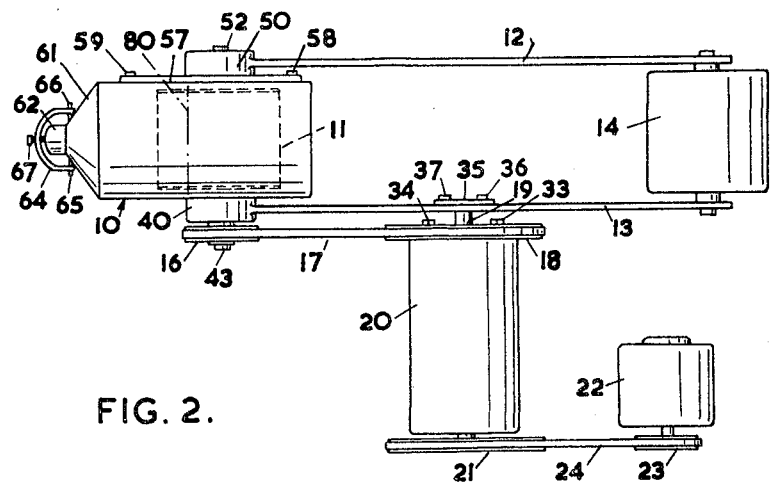
FIGURE 2 is a plan view of the apparatus shown in FIGURE 1.
Figure 3:
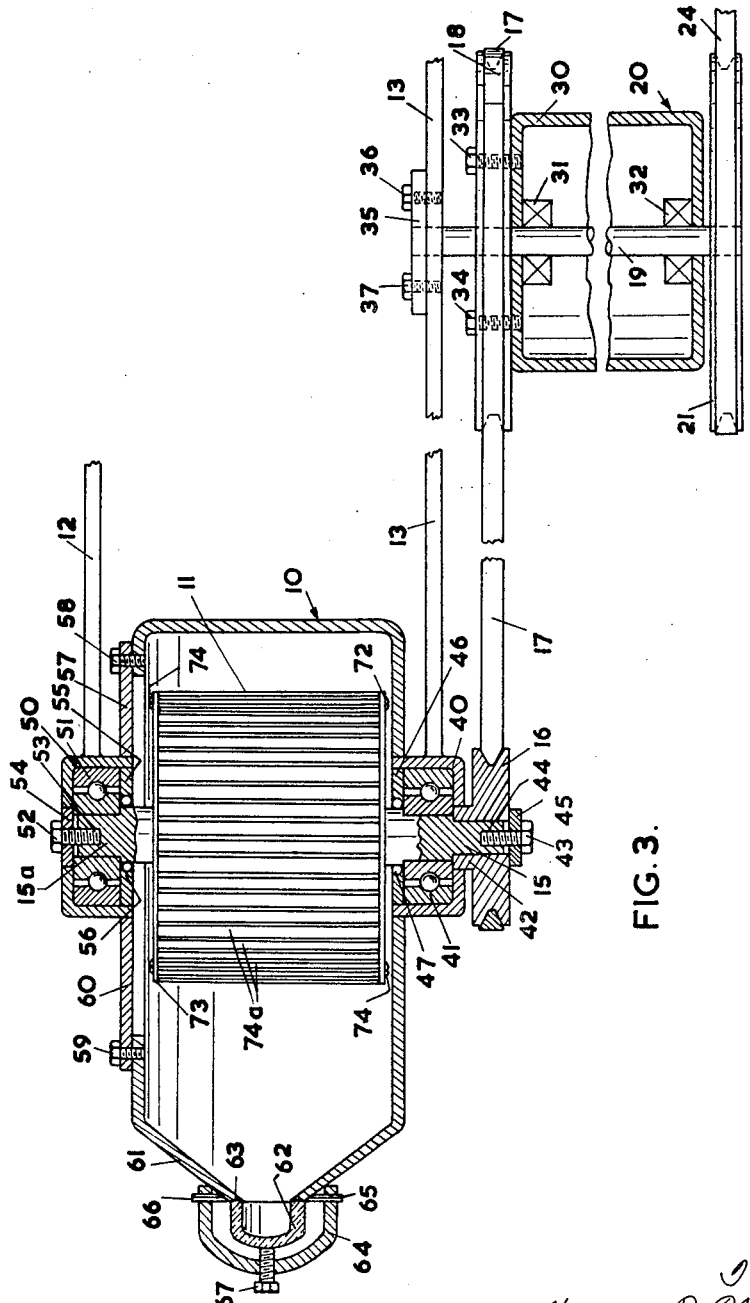
FIGURE 3 is a detailed sectional view on the line 3—3 of FIGURE 1.

Referring now to FIGURES 1 to 3 of the drawings, the apparatus illustrated comprises a container 10 within which there is a rotatable drum 11. Container 10 is mounted on arms 12 and 13. A counter-balance 14 is also mounted on arms 12 and 13. Rotatable drum 11 is mounted on stub shafts 15 and 15a which are journalled near the ends of arms 13 and 12 respectively. Pulley 16 drives stub shaft 15 to cause rotatable drum 11 to rotate and is driven by belt 17 from stationary pulley 18. Arm 13 is mounted on shaft 19 which is journalled in bearing assembly 20 and driven by pulley 21. A motor 22, which preferably is a variable speed electric motor, drives pulley 23. Belt 24 causes pulley 23 to drive pulley 21. It will be apparent that motor 22 will cause arms 12 and 13 to rotate with the consequence that container 10, together with drum 11, will move in a circular orbit. At the same time, stationary pulley 18 will cause pulley 16 to rotate so that drum 11 will rotate about its own axis.

Referring now to FIGURE 3, it will be noted that bearing assembly 20 comprises a housing 30 within which are mounted bearings 31 and 32 of shaft 19. Pulley 18 is secured to housing 30 by bolts 33 and 34. Shaft 19 is secured to hub 35 which, in turn, is secured to arm 13 by bolts 36 and 37.

Arm 13 has a bearing retainer 40 mounted on one end. Within bearing retainer 40 is disposed ball bearing 41. Stub shaft 15 is thus rotatably mounted in bearing retainer 40 by ball bearing 41. Pulley 16 has a hub 42 and is secured to stub shaft 15 by bolt 43 which engages an axial threaded hole 44 in stub shaft 15 and bears on disc 45 which in turn bears on pulley 16. Bearing retainer 40 also contains annular ring 46 within which is mounted sealing ring 47. Bearing retainer 40 is secured to container 10.

Arm 12 has, at its end, bearing retainer 50 within which is mounted ball bearing 51 for the rotatable mounting of stub shaft 15a. Bolt 52 threadably engages an axial hole 53 in stub shaft 15a and bears on disc 54. Annular ring 55 is mounted in bearing retainer 50 and supports ring seal 56. Bearing retainer 50 is mounted on plate 57 which forms part of container 10, but which is secured to the main body of container 10 by bolts 58 and 59. The disengagement of bolts 58 and 59 together with bolt 52 enables arm 12 together with plate 57 to be disengaged from the main body of container 10 for access to drum 11. Drum 11 can be removed from container 10 by also disengaging bolt 43 permitting stub shaft 15 to slide out of disengagement with its bearing, permitting drum 11 to be removed through the port 60 left by the removal of plate 57.

Container 10 also includes a conically shaped outer end wall 61 being truncated at its apex by a transparent sediment box 62. Sediment box 62 is seated in an annular groove 63 at the edge of portion 61 of container 10 and is retained in position by web 64 which is pivotally mounted on pins 65 and 66. Bolt 67 threadably engages web 64 and bears on sediment box 62 to retain it in position. The loosening of bolt 67 permits web 64 to swing to one side to permit the removal of sediment box 62.

Figure 4:
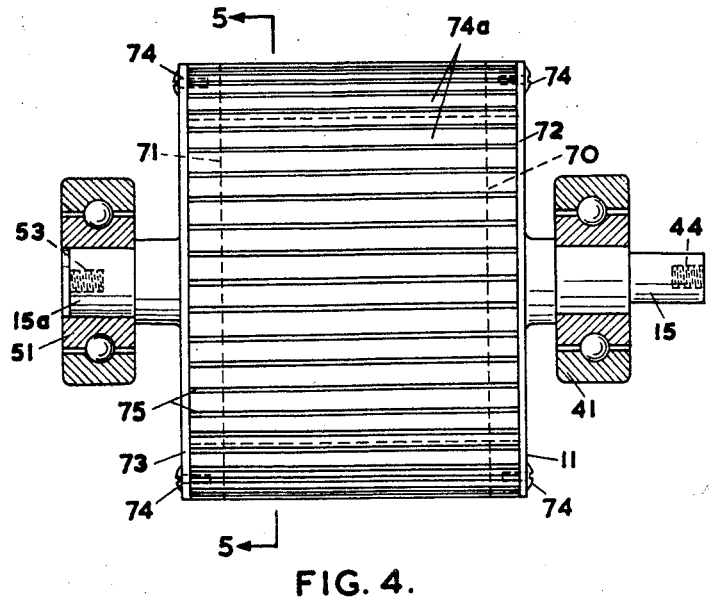
FIGURE 4 is a detailed plan view of the drum forming part of the apparatus shown in FIGURES 1 to 3.
Figure 5:
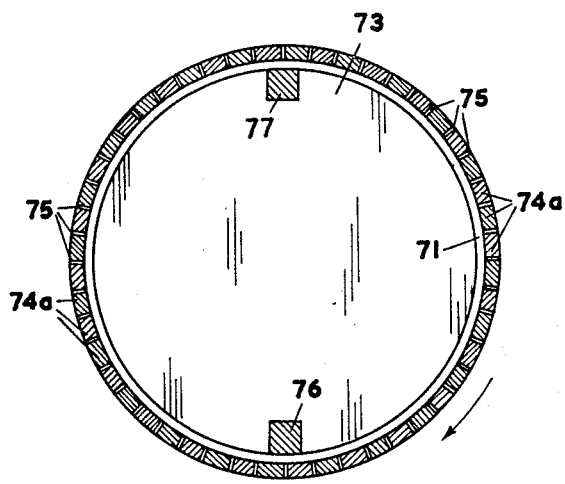
FIGURE 5 is a sectional view on the line 5—5 of FIGURE 4.

Referring now to FIGURES 4 and 5 of the drawings which show drum 11 in detail, drum 11 comprises rings 70 and 71 which are spaced apart and to which end plates 72 and 73 respectively are secured. End plate 72 can be permanently secured to ring 70 but end plate 73 is removably secured to ring 71 by bolts 74 to provide access to the interior of drum 11. Slats 74a are mounted on rings 70 and 71 so as to extend between the rings and around their entire periphery. Slats 74a are spaced from each other to define spaces 75. Stub shafts 15 and 15a are secured to plates 72 and 73 respectively. Baffles 76 and 77 are secured to rings 70 and 71 and extend parallel to the axis of rotation to drum 11 so that as drum 11 rotates, diamonds within drum 11 will be given a tumbling action.

Any desired spacing 75 can be used for slats 74a in order to permit diamonds which are smaller than a predetermined size to pass from the interior of drum 11 into container 10. By way of example, the slats can be three-eighths of an inch in width and spaced two-hundredths of an inch. The dimensions of the structure should be chosen so that the centrifugal force on the diamonds within drum 11, due to the rotation about its axis of drum 11, is greater than the centrifugal force due to the main orbit of drum 11 about the axis of shaft 19 so that the desired tumbling action will be achieved.

In operation the raw diamonds are loaded into drum 11 and drum 11 placed in position within container 10. Water or other suitable liquid is added to the interior of container 10 to provide the liquid level indicated at 80 during operation. Container 10 is closed and the rumbling operation is commenced. Small diamond particles of a size which will pass through the spacing 75 between the slats, pass from the interior of drum 11 into container 10 due to the centrifugal action of the rotation of drum 11, and because of the centrifugal action due to the orbital movement of container 10. The small particles of diamonds thus removed are collected in sediment box 62 which preferably is graduated. As a consequence these small diamond particles are preserved from further abrasion and reduction in size and, in addition, as sediment box 62 is transparent, the progress of the rumbling operation can be accurately controlled by observation of the amount of material which has collected in sediment box 62. Diamond particles of a size smaller than about two microns, however, remain in suspension in the liquid rather than being collected in sediment box 62 and exert a polishing action on the diamonds remaining in drum 11. The speed of rotation of drum 11 and the orbital movements can be varied according to the dimensions of the apparatus. However, typical speeds are 300 r.p.m. for the orbital movement and 1,500 r.p.m. for the rotation of drum 11 about its axis. The time of treatment will vary according to the charge and the desired degree of rounding of the diamonds but typically may be half an hour.

It is preferred that spaced slats be used as these provide elongated holes. The elongated holes present a particular advantage where diamonds suitable for drilling are being prepared in that they allow flat particles to be extracted. Such particles would be unsuitable for use in drilling. However, the use of other shapes of apertures is contemplated as being within the scope of this invention in its broadest aspect.

I claim:

1. A method of shaping crystalline bodies which comprises tumbling, crystalline bodies in the presence of a liquid in a grinding zone and continuously removing, crystalline bodies of a predetermined size range from said grinding zone leaving crystalline bodies of a size greater than said predetermined size range in said grinding zone.

2. A method of shaping crystalline bodies which comprises tumbling, crystalline bodies in the presence of a liquid in a grinding zone and continuously removing, crystalline bodies of a predetermined size range from said grinding zone leaving crystalline bodies of a size greater than said predetermined size range in said grinding zone and in which part of the crystalline bodies of a size less than said predetermined size range are maintained in said grinding zone in suspension in said liquid.

3. A method of shaping crystalline bodies which comprises tumbling, crystalline bodies in the presence of a liquid in a grinding zone and continuously removing, crystalline bodies capable of passing through an elongated opening from said grinding zone leaving crystalline bodies of a size greater than that which will pass through such elongated opening in said grinding zone and in which minute crystalline body particles are maintained in suspension in said liquid to provide a polishing action for crystalline bodies in said grinding zone.

4. A method as in claim 1 in which the crystalline bodies are diamonds.

5. A method as in claim 1 in which the crystalline bodies are diamonds and in which the diamonds retained in said grinding zone are of a size which will not pass through an elongated opening of about two hundredths of an inch.

6. An apparatus for shaping crystalline bodies comprising an enclosed container, a drum rotatably mounted in said container, said drum having a plurality of openings of predetermined size in its periphery, means for moving said container in an orbital path, and means for rotating said drum within said container to cause crystalline bodies within said drum to be subjected to a tumbling action.

7. An apparatus as in claim 6 in which said openings are elongated.

8. An apparatus as in claim 7 in which the narrow dimension of said elongated openings is about two hundredths of an inch.

9. An apparatus as in claim 6, in which said container comprises a transparent sediment box for collecting and visually observing crystalline particles which have passed through said openings.

10. An apparatus as in claim 6 in which said drum comprises a pair of circular end plates and a plurality of spaced slats extending between said end plates adjacent to their peripheries.

11. An apparatus as in claim 6 in which said drum comprises a pair of spaced rings, end plates secured to each of said rings, and a plurality of spaced slats mounted on said rings, and extending around their peripheries.

12. An apparatus as in claim 6 in which said drum comprises a pair of circular end plates and a plurality of spaced slats extending between said end plates adjacent their peripheries, and peripheral longitudinally extending baffle means within said drum to facilitate the tumbling action of crystalline bodies within said drum.

13. An apparatus for shaping crystalline bodies comprising a container having an opening at one side and a side plate detachably secured to enclose said container, a drum rotatably mounted in said container, said drum having openings of predetermined size in its periphery, bearings for said drum comprising a bearing mounted on and removable with said side plate, and a bearing mounted on said container, said drum being removable through the opening in said container upon the detachment of said side plate, supporting arms connected to said bearings and acting to guide the container in an orbital path, means to move said container in said orbital path and drive means connected to rotate said drum upon movement of the container in said orbital path.

14. An apparatus for shaping crystalline bodies comprising an enclosed container, a cylindrical drum rotatably mounted in said container for movement about the longitudinal axis of said drum, said drum having a plurality of openings of predetermined size in its periphery, means for moving said container in an orbital path in a substantially vertical circle and means for rotating said drum within said container to cause crystalline bodies within said drum to be subjected to a tumbling action.

(References on following page)

References Cited by the Examiner

UNITED STATES PATENTS

| | | | |
|---|---|---|---|
| 2,024,310 | 12/35 | Sundback | 51—316 |
| 2,425,984 | 8/47 | Blackman | 51—164 X |
| 2,461,366 | 2/49 | Bletso et al. | 51—164 X |
| 2,561,037 | 7/51 | Stanley | 51—164 |
| 2,735,421 | 2/56 | Cook | 125—30 |
| 3,013,365 | 12/61 | Harper | 51—164 |
| 3,013,776 | 12/61 | Patterson | 51—164 X |
| 3,030,746 | 4/62 | Firestine et al. | 51—284 |

LESTER M. SWINGLE, *Primary Examiner.*

JOHN C. CHRISTIE, J. SPENCER OVERHOLSER,
*Examiners.*